C. F. BETTMANN.
FAN ATTACHMENT FOR LAWN SWINGS.
APPLICATION FILED JULY 31, 1913.
1,125,799.
Patented Jan. 19, 1915.
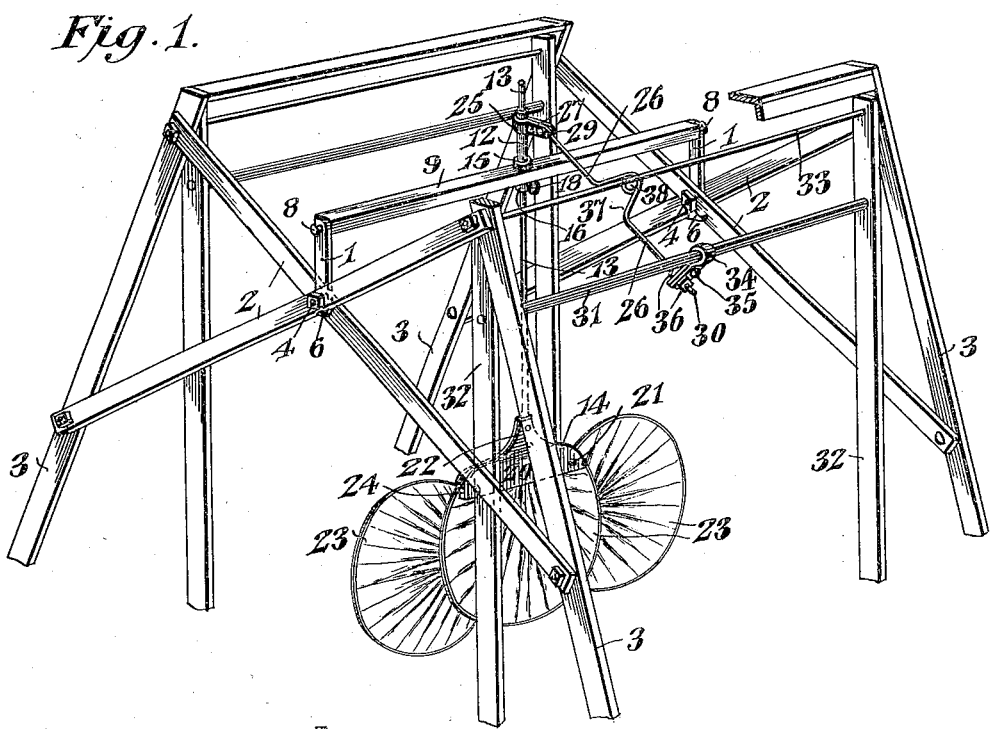
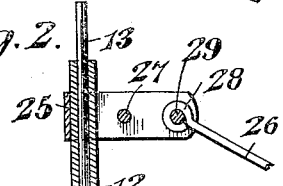
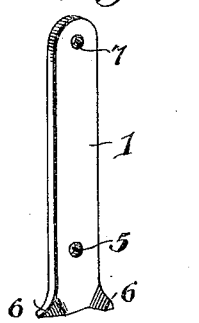
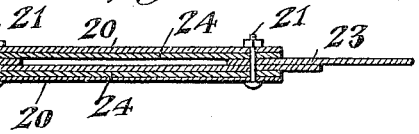
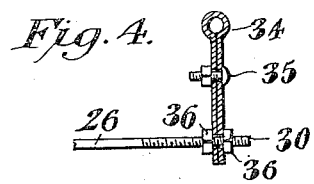
WITNESSES
Charles F. Bettmann, INVENTOR
BY
ATTORNEY

UNITED STATES PATENT OFFICE.

CHARLES FREDRICK BETTMANN, OF NEW ALBANY, INDIANA.

FAN ATTACHMENT FOR LAWN-SWINGS.

1,125,799.      Specification of Letters Patent.      Patented Jan. 19, 1915.

Application filed July 31, 1913. Serial No. 782,327.

*To all whom it may concern:*

Be it known that I, CHARLES F. BETTMANN, a citizen of the United States, residing at New Albany, in the county of Floyd and State of Indiana, have invented a new and useful Fan Attachment for Lawn-Swings, of which the following is a specification.

The invention relates to improvements in fan attachments for lawn swings.

The object of the present invention is to improve the construction of fan attachments for lawn swings, and to provide a simple, efficient and inexpensive fan attachment adapted to be readily applied to the ordinary lawn swing without necessitating any alteration in the construction thereof, and capable of being operated by the lawn swing to oscillate a fan between the two swinging seat carrying members of a lawn swing in a direction opposite to that of the said seat carrying members, whereby the occupants thereof will be automatically fanned while operating the swing.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a fan attachment, constructed in accordance with this invention and shown applied to a lawn swing. Fig. 2 is an enlarged detail vertical sectional view, illustrating the construction of the fan holder and the manner of mounting the same. Fig. 3 is a detail horizontal sectional view through the clamp of the fan holder. Fig. 4 is a detail sectional view of the outer clip of the fan attachment. Fig. 5 is a detail perspective view of one of the bearing arms for supporting the transverse pivot of the fan attachment.

Like numerals of reference designate corresponding parts in all the figures of the drawing.

In the accompanying drawing in which is illustrated the preferred embodiment of the invention, 1—1 designat vertically disposed bearing arms, constructed of suitable metal and extending upwardly from the crossed side braces 2 of the supporting frame 3 of an ordinary lawn swing and secured to the said braces by the central bolt 4 thereof. The bearing arms 1 are preferably fitted between the crossed braces 2 and they are provided at their lower portions with perforations 5 through which pass the bolts 4, and the lower corners 6 of the bearing arms are bent in opposite directions to form lugs or projections for engaging the braces 2 at the lower edges thereof, whereby the bearing arms are prevented from turning on the bolts 4. By this construction, each bearing arm 1 is firmly supported in an upright position on a single central bolt and is prevented from swinging downwardly. The bearing arms are provided at their upper ends with bearing openings 7 for the reception of pivot pins 8 of a transverse pivot bar 9, extending across the swing at the center of the top portion thereof, and provided with a central opening 10 into which is screwed the lower threaded portion 11 of a tube 12, which extends entirely through the pivot bar 9 and projects upwardly and downwardly therefrom. The tube 12, which constitutes a holder for a rod or stem 13 of a fan holder 14, is firmly secured in the central opening of the pivot bar 9 by upper and lower lock nuts 15 and 16, arranged on the threaded lower portion 11 of the tube 12 and engaging the upper and lower faces of the pivot bar 9. The lower lock nut is provided with a threaded perforation 17 for the reception of a set screw 18, which extends through an opening 19 and engages the rod or stem 13 to enable the fan holder to be raised or lowered and to secure the same in its vertical adjustment. The tube 12 is arranged in the opening 10 of the pivot bar 9 in proper position so that when the lower lock nut 16 is screwed against the lower face of the pivot bar the threaded perforation 17 of the lock nut will register with the opening 19, which is slightly larger than the perforation. The fan holder comprises the said vertical rod or stem 13 and a lower clamp 20 composed of side plates connected by bolts 21 and provided with tapered upper portions 22, which are riveted or otherwise secured to the lower end of the rod or stem. The side plates of the clamp 20 are resilient and are adapted to clamp a plurality of palm leaf fans 23, which are preferably arranged as illustrated in Fig. 1 of the drawing, and they constitute an inexpensive and efficient fan blade, but any other suitable form of fan blade may, of course, be employed. The bolts 21 are preferably arranged at the ends of the side plates and strips 24 of wood or any other suitable material may be arranged at the inner faces of the side plates for directly engaging the palm leaf fans 23.

The upper projecting portions of the tube 12 constitutes an arm, which is engaged by a clip 25 for attaching the inner end of a connecting rod 26 to the said arm. The clip 25 is preferably constructed of a strip of metal bent at the center to form a sleeve for embracing the tube 5 and having extended terminal portions, which are connected by a transverse adjusting bolt 27. The bolt is spaced from the terminals of the projecting portions of the clip, which receives the rod 26 between such projecting portions. The rod 26, which is constructed of resilient material, is provided at its inner end with an eye 28, which is pivoted between the projecting portions of the inner clip 25 by a bolt 29 or other suitable fastening device. The bolt 27 adjustably clamps the inner clip on the upwardly projecting portion of the tube 12 and enables the said inner clip to be arranged the proper distance from the pivot bar 9 to secure the desired degree of oscillation of the fan.

The spring connecting rod 26 has its outer terminal portion 30, connected with the upper crossed rod 31 of one of the oscillatory seat supporting members 32 of the lawn swing. The oscillatory seat supporting member 32 is pivoted above the rod 31 to the supporting frame of the lawn swing by a transverse pivot rod 33 in the usual manner. By this arrangement, the outer end of the spring connecting rod is connected with the seat supporting member 32 of the lawn swing at a point below the pivot of the said member, and the inner end of the connecting rod is connected to the fan holder above the pivotal point thereof. By connecting the terminals of the rod 26 to opposite sides of the pivotal point of the seat supporting member 32 and the fan holder, the latter is moved in the opposite direction to that of the seat supporting members of the lawn swing, whereby the occupants thereof will be effectively fanned when the seat supporting members are in motion. The outer terminal portion 30, which is threaded, pierces projecting portions of an outer clip 34, constructed substantially the same as the inner clip and having its sleeve portion embracing the rod 31 of the seat supporting member 32. The projecting portions of the outer clip are connected at an intermediate point by an adjusting bolt 35, and the threaded terminal portion 30 of the spring connecting rod receives a pair of nuts 36 arranged to clamp between them the projecting portions of the outer clip.

When the seat supporting member is oscillated, motion is imparted to the projecting upper portion or arm of the tube 12, and in order to enable the seat supporting member to be swung at a full stroke without injury to the fan attachment even when the parts of the fan attachment are not exactly proportioned to correspond with the stroke or oscillation of the seat supporting member 32, the spring connecting rod is provided at a point intermediate of its ends with a substantially U-shaped bend 37 composed of spaced sides and a spring coil 38, located at the outer portion of the U-shaped bend and connecting the sides thereof. By this construction, the attachment is adapted to be applied to various swings without danger of straining or breaking the attachment when the seat members are at a full or complete stroke, as the spring bend will yield and permit a longer swing of the seat supporting member than would be possible if a rigid rod were employed. The nuts 36 and the threaded terminal portion 30 of the spring connecting rods enable the latter to be adjusted longitudinally to set the fan attachment approximately in proper position to correspond with the stroke of the seat supporting members.

What is claimed is:—

1. In combination with a lawn swing including a stationary supporting frame and spaced oscillatory seat carrying members, an oscillatory fan, means for pivotally mounting the fan on the stationary supporting frame between the oscillatory seat supporting members, and a rod or member pivotally connected at its inner end with the fan and extending outwardly therefrom to one of the oscillatory seat supporting members, the outer end of the rod being also pivotally connected to such seat supporting member, whereby the fan will be oscillated by the seat supporting member.

2. In combination with a lawn swing including a stationary supporting frame and spaced oscillatory seat carrying members, an oscillatory fan, means for pivotally mounting the fan on the stationary frame at a point between the opposite oscillatory seat supporting members, and a rod pivotally connected at its inner end with the fan at one side of the pivotal point thereof and extending outwardly to one of the seat supporting members, said rod being also pivoted at its outer end to such seat supporting member at the opposite side of the pivot thereof, whereby the fan and the seat supporting member will be oscillated in opposite directions.

3. The combination with a lawn swing including a supporting frame and an oscillatory member, a transverse pivot mounted on the supporting frame and having an upwardly extending arm, a fan carried by the said pivot, and a connecting rod extending from the arm of the said pivot to the oscillatory seat supporting member and connected with the latter below the pivotal point thereof, whereby the fan will move in the opposite direction to the seat supporting member.

4. A fan attachment for lawn swings including an oscillatory fan, means for pivotally mounting the same on the supporting frame of a lawn swing, and a connecting rod extending from the fan to an oscillatory seat supporting member of the lawn swing, said connecting rod being provided with a spring bend adapted to yield to permit an extended movement of the oscillatory member without injuring the fan attachment.

5. A fan attachment for lawn swings including an oscillatory fan, means for pivotally mounting the same on the supporting frame of a lawn swing, and a connecting rod extending from the fan to an oscillatory seat supporting member of the lawn swing, said rod being provided with an approximately U-shaped bend having a spring coil connecting the sides of the said bend.

6. A fan attachment for lawn swings including a transverse pivot provided with a tubular arm, means for mounting the pivot on the supporting frame of a lawn swing, a fan having a rod or stem secured in the tubular arm, a connecting rod connected at one end to the tubular arm, and means for connecting the other end of the said rod to an oscillatory seat supporting member of the lawn swing.

7. A fan attachment for lawn swings including a transverse pivot having an arm, means for mounting the pivot on the supporting frame of a lawn swing, a fan carried by the said pivot, a connecting rod, an inner clip mounted on the arm of the transverse pivot and pivotally connected to the inner end of the said rod, and an adjustable clip adapted to engage an oscillatory seat supporting member of the lawn swing and adjustably secured to the outer portion of the connecting rod.

8. A fan attachment for lawn swings including side bearing arms provided at their lower ends with oppositely disposed lugs or projections adapted to engage the side braces of the supporting frame of a lawn swing, whereby the bearing arms are mounted in a fixed position, a transverse pivot supported by the bearing arms, a fan depending from and carried by the said pivot, and means for connecting the pivot with an oscillatory seat carrying member of the lawn swing for oscillating the fan.

9. A fan attachment of the class described including a pivotally mounted fan holder consisting of a rod or stem, and a clamp carried by the rod or stem and provided with side clamping plates adapted to engage a plurality of fans, means for pivotally mounting the fan holder, and means for oscillating the same.

10. A fan attachment for lawn swings comprising a pendant oscillatory fan, means for pivotally mounting the same on the stationary supporting frame of a lawn swing between the opposite oscillatory seat supporting members thereof, and means for connecting the fan with one of the said seat supporting members, said connecting means being connected with the fan above the pivotal point and with the seat supporting member below the pivotal point thereof, whereby the fan and the seat supporting member will move in opposite directions when the said member is oscillated.

In testimony that I claim the foregoing as my own, I have hereto affixed my signature in the presence of two witnesses.

CHARLES FREDRICK BETTMANN.

Witnesses:
WILLIAM HERMAN BETTMANN,
OTTLIE VIRGIL EBLEISOR.

Copies of this patent may be obtained for five cents each, by addressing the "Commissioner of Patents, Washington, D. C."